United States Patent
Shankar et al.

(10) Patent No.: US 7,613,924 B2
(45) Date of Patent: Nov. 3, 2009

(54) ENCRYPTED AND OTHER KEYS IN PUBLIC AND PRIVATE BATTERY MEMORIES

(75) Inventors: Narendar Shankar, Dallas, TX (US); Erdal Paksoy, Richardson, TX (US); Todd Vanyo, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 815 days.

(21) Appl. No.: 11/074,611

(22) Filed: Mar. 8, 2005

(65) Prior Publication Data
US 2006/0204004 A1 Sep. 14, 2006

(51) Int. Cl.
*H04L 9/32* (2006.01)
*G06F 21/00* (2006.01)

(52) U.S. Cl. ............... 713/168; 713/170; 713/171; 713/194

(58) Field of Classification Search ............ None
See application file for complete search history.

(56) References Cited

U.S. PATENT DOCUMENTS

| | | | |
|---|---|---|---|
| 5,858,500 A * | 1/1999 | MacPherson | 428/68 |
| 6,263,438 B1 * | 7/2001 | Walker et al. | 713/178 |
| 6,975,092 B2 * | 12/2005 | Edington et al. | 320/106 |
| 7,366,815 B2 * | 4/2008 | Kadowaki | 710/305 |
| 2005/0001589 A1 * | 1/2005 | Edington et al. | 320/128 |
| 2005/0050325 A1 * | 3/2005 | Ohkubo | 713/168 |
| 2005/0188206 A1 * | 8/2005 | Kwok | 713/176 |
| 2006/0178170 A1 * | 8/2006 | Chung et al. | 455/572 |

* cited by examiner

*Primary Examiner*—Benjamin E Lanier
(74) *Attorney, Agent, or Firm*—Lawrence J. Bassuk; W. James Brady; Frederick J. Telecky, Jr.

(57) ABSTRACT

Systems and methods for providing a battery module 110 with secure identity information and authentication of the identity of the battery 110 by a host 120. In one embodiment, the system for providing a battery module with secure identity information includes: (1) a tamper resistant processing environment 200 located within the battery module 110 and (2) a key generator configured to generate a key based on an identity of the battery module 110 and cause the key to be stored within the tamper resistant processing environment 200.

14 Claims, 5 Drawing Sheets

ENCRYPTED AND OTHER KEYS IN PUBLIC AND PRIVATE BATTERY MEMORIES

TECHNICAL FIELD OF THE INVENTION

The present invention is directed, in general, to "smart" batteries and, more specifically, to a system and method for secure authentication of a smart battery by a host.

BACKGROUND OF THE INVENTION

Modern battery-operated devices are powerful and vital tools for both business and personal use. Hosts include wireless communication devices such as cell telephones and computing devices such as portable computers, personal digital assistants (PDAs) and hybrid computer/communication devices.

Early hosts used nickel-cadmium (NiCd) batteries. However, those batteries were subject to memory effects and toxicity of the cadmium components. Nickel-metal-hydride (NiMH) batteries do not suffer from a memory effect, and are more environmentally benign, but also suffer from shortcomings, including high self-discharge rates and limited service life.

Several problems are common to both battery types. First, battery life is dependent on appropriate charge-discharge profiles. In the extreme, an excessive rate of charge or discharge can result in battery leakage or explosion, posing a risk to the battery-powered device and to the public. Second, without some form of authentication, the battery can be easily cloned, allowing substandard battery designs to be used, and risking the original equipment manufacturer's revenue stream from lost battery sales.

The development of "smart" battery technology provides a partial solution to these deficiencies. Batteries using this technology include circuitry to communicate state-of-charge or state-of-health information to the user, charger or host device. For example, the battery may illuminate a number of LEDs to indicate the state-of-charge, or provide this information via a digitized data stream to the host device.

Two protocols for the host-battery interface are known: the single wire bus and the "SMBus." The single wire bus is comparatively rudimentary, and is used to communicate the battery code and basic operating parameters. The SMBus, by comparison, is more sophisticated, and is intended to move the charge control from the charger to the battery. In this way, a universal charger can be used to charge batteries with different chemistries. The SMBus system stores more detailed information about the battery, including battery ID number and type, serial number and date of manufacture.

Smart battery technology provides a means to authenticate the battery to the charger or battery-powered device. Identification of the battery to the charger allows for the use of a generic charger that uses different charging algorithms for different battery chemistries. For example, this feature allows for the use of a discharge cycle that would be appropriate for NiCd batteries but not for NiMH batteries, and vice versa. Authentication also provides a means for the battery-powered device to accept or reject a particular battery, addressing the concerns previously set forth.

A deficiency of the current authentication schemes, however, is the relative ease with which a clone manufacturer can copy smart battery circuitry. Access to cryptographic keys used for authentication is possible by readily available reverse engineering techniques, such as deprogramming of the memory module of the authentication module. What is needed in the art is a more secure way to provide authentication for battery modules, such that cloning by bulk theft is frustrated and preferably infeasible.

SUMMARY OF THE INVENTION

To address the above-described deficiencies of the prior art, the present invention provides systems and methods for providing a battery module with secure identity information and secure identity authentication between the battery module and a host.

In one aspect, the present invention provides a system for providing a battery module with secure identity information. In one embodiment, the system includes: (1) a tamper resistant processing environment located within the battery module and (2) an identity key generator configured to generate an identity key for each battery module and cause the identity key to be stored within the tamper resistant processing environment.

In another aspect, the present invention provides a method of providing a battery module with secure identity information. In one embodiment, the method includes: (1) locating a tamper resistant processing environment within the battery module, (2) generating an identity key for the battery module and (3) causing the identity key to be stored within the tamper resistant processing environment.

In yet another aspect, the present invention provides a system for secure authentication of a battery module by a host. In one embodiment, the system includes: (1) a challenge receiver operable within the battery module and configured to receive a challenge from the host and (2) a response generator operable within the battery module and configured to generate a response based on an identity key stored within a tamper resistant processing environment of the battery module.

In still another aspect, the present invention provides a method of secure authentication of a battery module by a host. In one embodiment, the method includes: (1) receiving a challenge from the host and (2) generating a response based on an identity key stored within a tamper resistant processing environment of the battery module.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
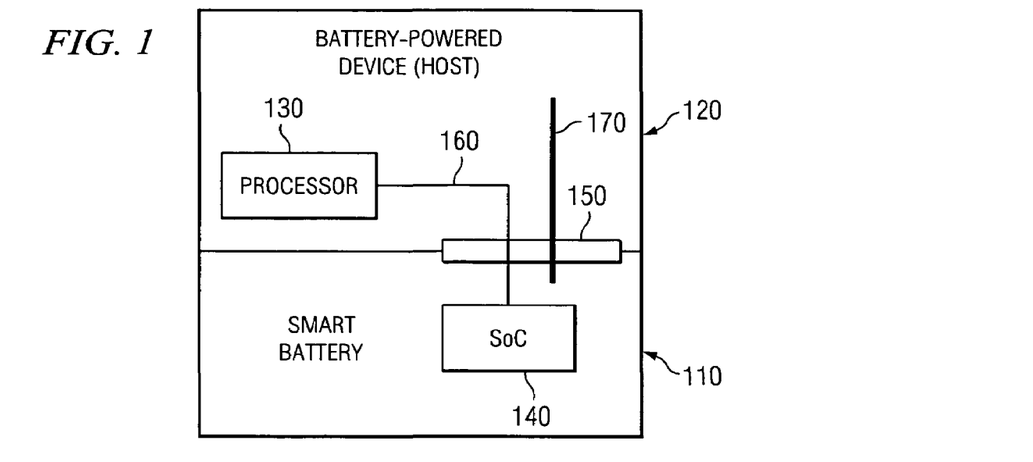
FIG. 1 illustrates a schematic diagram showing a smart battery coupled to a battery-powered device.

Referring first to FIG. 1, a schematic diagram is shown of one embodiment of a battery module, termed a "smart battery" 110, coupled to a battery-powered device ("host") 120. A host 120 may be a cell phone or other portable consumer electronic device, but the invention is not limited to such applications. A processor 130 resides within the host 120, and may be designed into the host 120 to support its primary intended function, or may be designed into the host 120 specifically to support battery authentication. Additionally, the processor 130 may be an Open Multimedia Applications Platform (OMAP™) processor, commercially available from Texas Instruments, Inc., of Dallas, Tex. A system-on-a-chip (SoC) 140 resides within the smart battery 110. The SoC 140 is discussed below in detail, and embodies the functional blocks necessary to support cooperative authentication with the host 120. A conventional interface 150 couples the processor 130 with the SoC 140, with data transmitted between the processor 130 and the SoC 140 over a data bus 160 and power coupled through a power bus 170.

Figure 2:
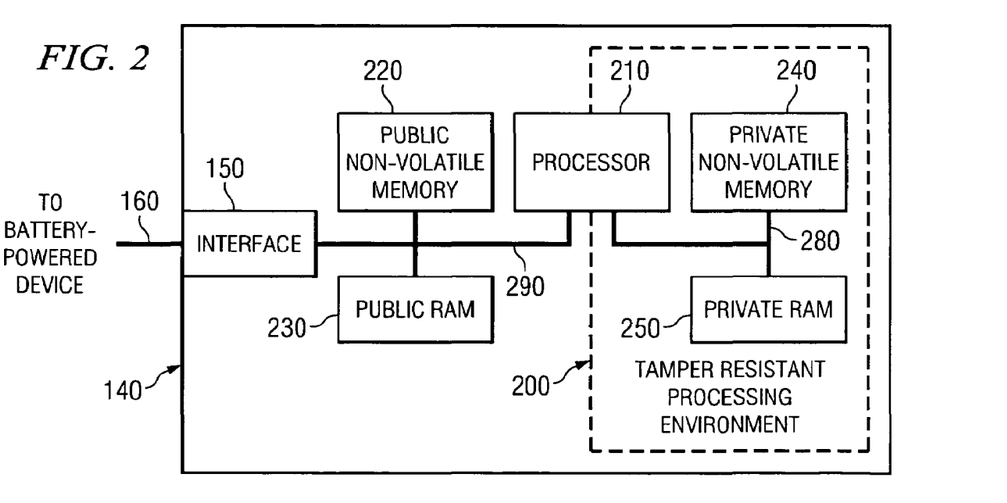
FIG. 2 illustrates a block diagram of one embodiment of a system-on-a-chip (SoC) for providing a battery module with secure identity information constructed according to the principles of the present invention.

Turning now to FIG. 2, a block diagram of one embodiment of SoC 140 is shown. The SoC 140 has a tamper resistant processing environment (TRPE) 200, and a public environment including functional elements outside the TRPE. Those skilled in the pertinent art are aware that a TRPE is, in general, designed to perform according to the following objectives: (1) programs running within the TRPE are either embedded in tamper resistant non-volatile memory or, if running in private RAM, authenticated and therefore free of unexpected code before being admitted to run within the TRPE, (2) programs and data within the TRPE are free from unwanted interference from outside the TRPE and (3) programs and data within the TRPE cannot be read from outside the TRPE. Components within the TRPE are isolated from user-accessible memory, buses or external pins to meet the aforementioned objectives. For this reason and as will be described in the following description, TRPEs are often provided with their own isolated, secure memory and buses. In the illustrated embodiment, the TRPE 200 serves to protect secret and private keys used to identify the smart battery 110.

The SoC 140 includes a processor 210, public non-volatile memory 220, public random-access memory (RAM) 230, private non-volatile memory 240 and private RAM 250. One or more of these memory elements may not be needed in certain embodiments, described below. The public and private non-volatile memories 220 and 240 may be flash memory, EEPROM, or a present or future embodiment of electrically rewritable nonvolatile memory. The private non-volatile memory 240 and the private RAM 250 are fully contained within the TRPE 200, while processor 210 functions both within and outside the TRPE 200. Within the TRPE 200, data are passed securely among the functional blocks of the TRPE 200 via a private bus 280. Thus, the contents of memory within the TRPE 200, and data transmitted among the functional blocks of the TRPE 200 are protected from external manipulation and examination.

The public area of the SoC 140 comprises all functional elements that are not within the TRPE 200. These elements include the conventional interface 150, the public non-volatile memory 220 and the public RAM 230, as well as the processor 210. Within the public area, these functional elements are coupled via a public bus 290.

Figure 3:
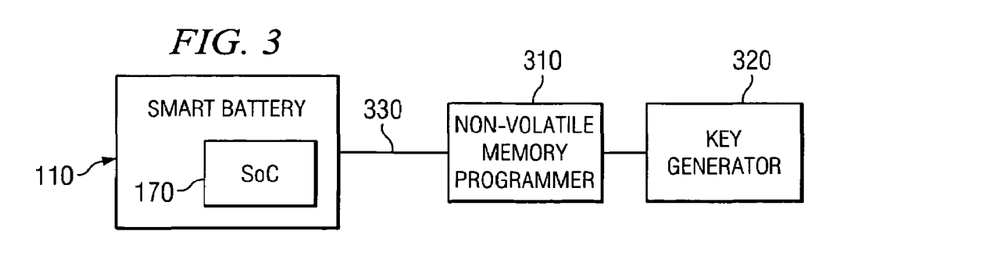
FIG. 3 illustrates a smart battery module coupled to a non-volatile memory programmer, which in turn is coupled to an identity key generator.

Turning now to FIG. 3, illustrated is one embodiment of a system for providing a smart battery 110 with an identity key associated with the smart battery 110 according to the principles of the invention. A non-volatile memory programmer 310 performs the function of programming the smart battery 110. Those skilled in the pertinent art understand that the non-volatile memory programmer 310 is responsible for providing an image that is written into non-volatile memory (public non-volatile memory 220 and private non-volatile memory 240 in FIG. 2) within the smart battery 110 via a programming link 330. In the broadest usage, the image may contain applications that are to execute within the device of which the non-volatile memory is a part. In the specific context of the present invention, data representing an identity of the smart battery 110 will be transmitted to at least the private non-volatile memory 240, and in some embodiments, also the public non-volatile memory 220. The content of this transmission depends on the embodiment of the authentication algorithm, as will be described fully below.

In FIG. 3, the non-volatile memory programmer 310 is coupled to an identity key generator 320. The identity key generator 320 is shown externally coupled to the non-volatile memory programmer 310, but could also be contained within the non-volatile memory programmer 310. The identity key generator 320 is configured to generate a cryptographic key to be associated with the smart battery 110, and to transmit this key, which may be a function of the identity of the smart battery 110, to the non-volatile memory programmer 310. The non-volatile memory programmer 310 then creates a non-volatile memory image and causes the image to be stored in the private non-volatile memory 240, and if necessary, the public non-volatile memory 220. In an exemplary embodiment, the identity of the smart battery 110 is a unique manufacturing serial number of the smart battery 110, but it will be immediately apparent to those skilled in the art that other identities of the smart battery 110 could be used, such as lot number, date of manufacture, or design revision number. More generally, the identity key is a number assigned to the smart battery 110 and, in a preferred embodiment, is a number that is at least pseudorandom that cannot be readily derived from any other publicly known information associated with the smart battery 110.

After one or both non-volatile memories 220, 240 are written, as necessary, the smart battery 110 is enabled to authenticate itself to a host device that has been programmed to accept the smart battery 110. Several exemplary embodiments of authentication algorithms follow.

Figure 4:
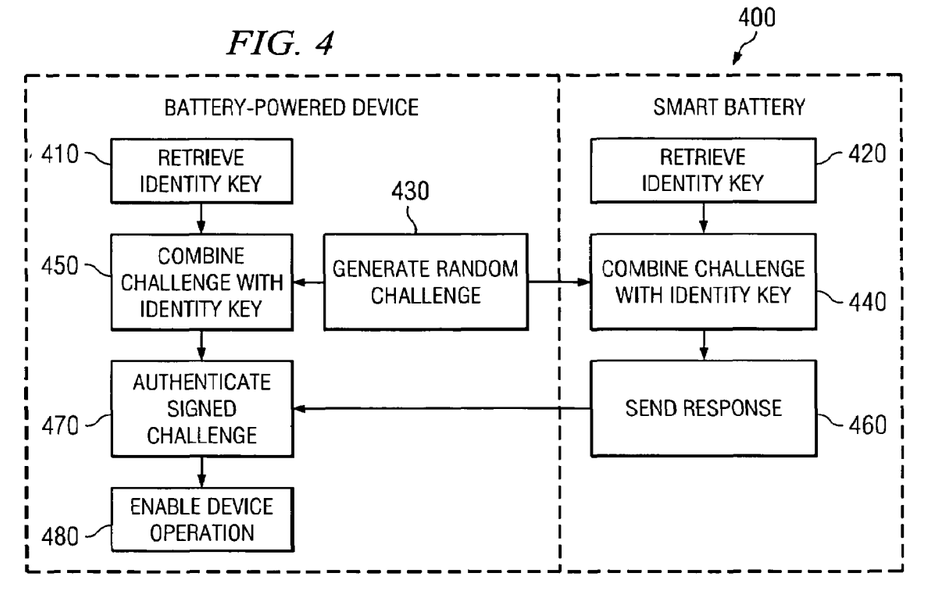
FIG. 4 illustrates a flow diagram of one embodiment of a method of authentication of the identity of a battery by a host carried out according to the principles of the present invention.

Turning now to FIG. 4, illustrated is a flow diagram 400 of one embodiment of a method of authentication of the identity of a battery carried out according to the principles of the invention. In this embodiment, the smart battery 110 and host 120 are programmed with a shared identity key representing a potentially large number of batteries. For example, the shared identity key may correspond to a battery model number, and could be identical for all batteries of a particular model. Non-volatile memory programmer 310 causes the identity key to be stored in private non-volatile memory 240, where it is not easily accessible to an "attacker," i.e., a person intending to access the identity for the purpose of copying the smart battery 110. The same identity key is also stored on the host by a means that makes it difficult to discover, such as embedding it in binary code, or storing it in a secure storage location protected by a secure execution environment or TRPE.

The flow diagram 400 is divided between those steps performed by the smart battery 110, and those performed by the host 120. In a step 410, the host 120 retrieves the locally stored identity key, and in a step 420 the smart battery 110 retrieves the identity key from private non-volatile memory 240. In a step 430, the host 120 generates a pseudorandom challenge that is used internally to the host 120 and is also communicated to the smart battery 110. Once received by the smart battery 110, the challenge is combined in a step 440 with the identity key using a message integrity check algorithm inside the TRPE to generate a first response.

Those skilled in the pertinent art will understand that a message integrity check algorithm is a method of creating a message digest of a digital message that for all practical purposes is unique to that message, and that there are numerous algorithms that may be employed to test the integrity of the identity key. In one embodiment of the invention, the message integrity check algorithm is a cyclic redundancy checking algorithm (CRC), as described in IEEE Std 802.3-2000, using polynomial coefficients and an initial CRC value stored as part of the identity key. In an alternate embodiment, the message integrity check algorithm is a hashed message authentication code algorithm (HMAC) using a secure hash algorithm (SHA), as described in Federal Information Processing Publication (FIPS PUB) 180-1. Any prior or future suitable integrity check algorithm used to generate a signature of a digital message is within the scope of the present invention.

Continuing with FIG. 4, In a step 450, the processor 130 in the host 120 is used to process the challenge, again using the aforementioned message integrity check algorithm and the copy of the identity key stored in the host, thereby generating a second response. In a step 460, the first response is communicated from the smart battery 110 to the host 120. In a step 470, the processor 130 compares the first and second responses. If the comparison results a match, the smart battery 110 is authenticated, and the processor 130 enables normal operation of the host 120 in a step 480. If the comparison results in a mismatch, the processor 130 disables operation of the host 120.

In the previous and following flow diagrams, the flow of steps is not necessarily in the order recited. Temporal ordering of steps is only necessary to the extent that one step inherently depends on the result of a previous step. Hence, for example, a series of steps may be executed in parallel such as steps 410-450 in the host 120 and steps 420-440-460 in the smart battery 110.

The embodiment shown in FIG. 4 has the advantage that it is relatively simple to implement, requiring minimal management of identity keys. However, a potential disadvantage of the embodiment is that if the identity key from a single battery is acquired by an attacker, then an unlimited number of copies of that battery can be produced with the same identity key, and the host will have no way to distinguish an original battery from a copy. Furthermore, if, in an effort to invalidate the cloned battery, the compromised identity key is black-listed, then a large number of valid devices sharing the same identity key will also be invalidated.

To increase security against an attack, a second embodiment of the invention employs an encrypted identity key of the smart battery 110. In this embodiment, identity key generator 320 is used to encrypt the identity key of the smart battery 110 using a root key to provide additional security. Additionally, each smart battery 110 is programmed with its own unique identity. An encryption algorithm such as triple Data Encryption Standard, or "3DES," is used to encrypt the identity key. Those skilled in the pertinent art are aware that 3DES is a data encryption standard based on DES. Moreover, an Advanced Encryption Standard has been developed to eventually supersede 3DES. Any such currently existing or future digital data encryption algorithm is within the scope of the invention.

The non-volatile memory programmer 310 causes the encrypted identity key to be stored in the public non-volatile memory 220, and the unencrypted identity key to be stored in the private non-volatile memory 240 during manufacture of the smart battery 110. The root key is also stored in the host 120, in a manner that makes it difficult for an attacker to examine the root key.

Figure 5:
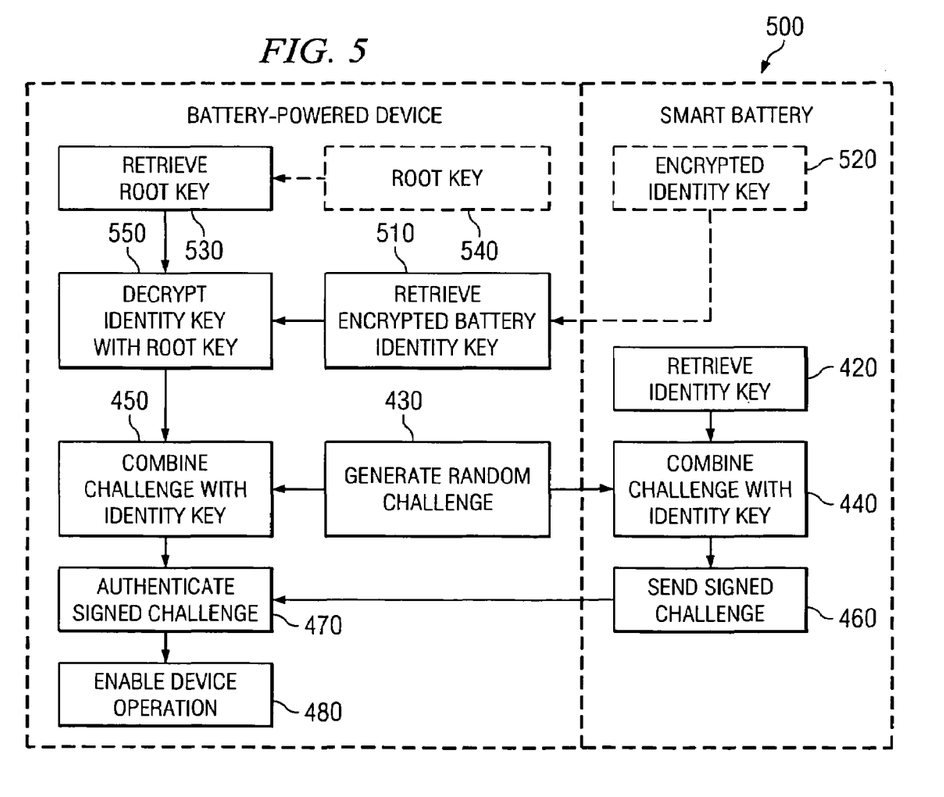
FIG. 5 illustrates a flow diagram of an alternate embodiment of a method of authentication of the identity of a battery by a host, employing a root key on the host, carried out according to the principles of the present invention.

Operation of this embodiment is illustrated in FIG. 5, in which flow diagram 500 shows a method of authentication of the identity of a battery by a host, employing a root key on the host, carried out according to the principles of the present invention. Authentication of the smart battery 110 begins with a step 510, in which the encrypted identity key 520 stored in smart battery 110 is communicated to the host 120. Those skilled in the art will recognize that the encrypted identity key could either be read by the host 120 or transmitted by the battery 110. In a step 530, the host 120 retrieves the locally stored root key 540. In a step 550, the host decrypts the encrypted identity key with the root key to extract the identity key. To reduce the chance of illicit intercept of the root key and decoded battery identity, these steps performed by the host may be executed in a secure execution mode, such as the secure mode available in OMAP™ devices. As in the previous embodiment and flow diagram, the smart battery 110 retrieves the unencrypted identity key from private non-volatile memory 240 in step 420. The authentication algorithm then continues in a manner analogous to the steps beginning with step 430 in FIG. 4, described previously.

In spite of the additional security provided by this embodiment, an attacker can still make unauthorized copies of a smart battery 110 by copying the public non-volatile 220 and private non-volatile 240 memories of the SoC 140. In this event, a particular battery identity can be programmed into future host devices to exclude, or blacklist, batteries with compromised identity.

Figure 6:
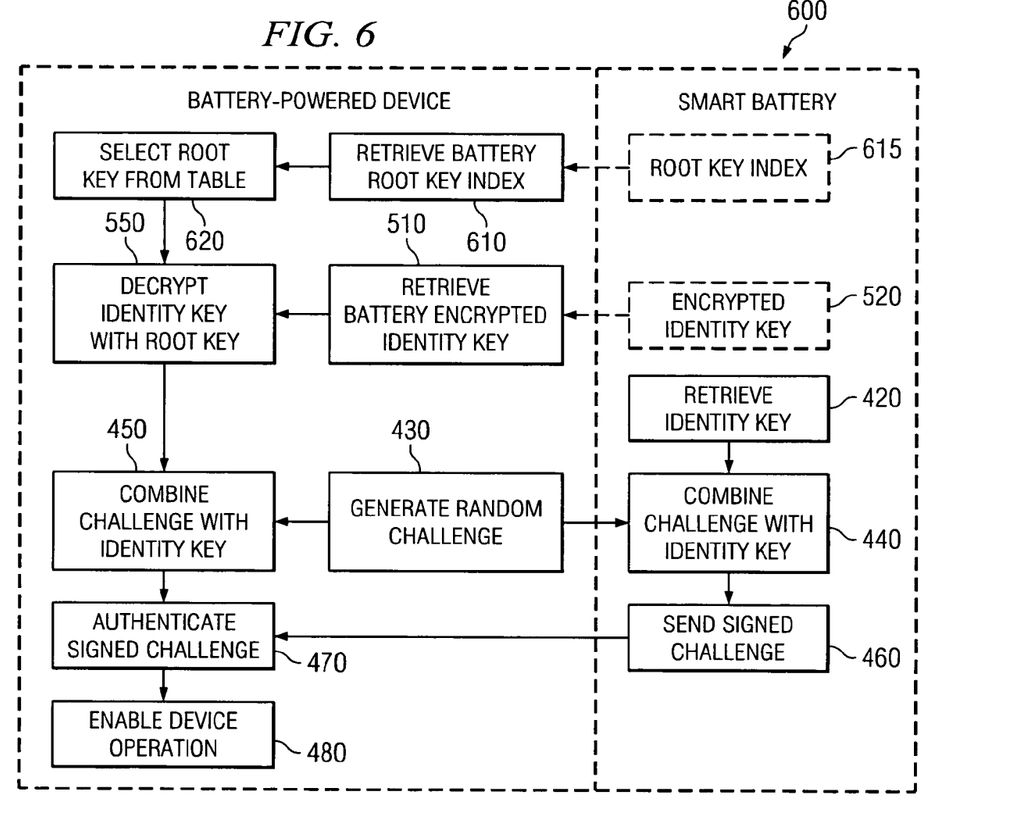
FIG. 6 illustrates a flow diagram of another alternate embodiment of a method of authentication of the identity of a battery by a host, employing a root key table and root key index, carried out according to the principles of the present invention.

In another alternate embodiment of authentication of battery and a host, increased flexibility of assigning an identity to smart battery 110 can be accomplished by use of a root key table and root key index. In FIG. 6, illustrated is a flow diagram 600 of such an embodiment, carried out according to the principles of the present invention. The flow diagram 600 calls for multiple root keys to be stored on the host 120 in a root key table, and a root key index to be provided by the smart battery 110 to gain access to a particular root key.

Use of the root key table provides additional flexibility, such as assigning root keys to different authorized battery manufactures. Security of the identity key is accomplished as in the previous embodiment, by encrypting the identity key communicated from the smart battery 110 to the host 120. The root key index and encrypted identity key are stored into the public flash 220, and the unencrypted identity key is programmed into the secure flash 240 by the non-volatile memory programmer 310.

In this embodiment, the authentication of the smart battery 110 begins with a step 610, in which the root key index 615 is communicated from the smart battery 110 to the host 120. As before, this datum may be read by host 120 or transmitted by smart battery 110. In a step 620, the host 120 selects a root key from a locally stored root key table based on the root key index received from the smart battery 110. Authentication continues as previously described, beginning with communication of the encrypted identity key from the smart battery 110 to the host 120 in step 510.

Figure 7:
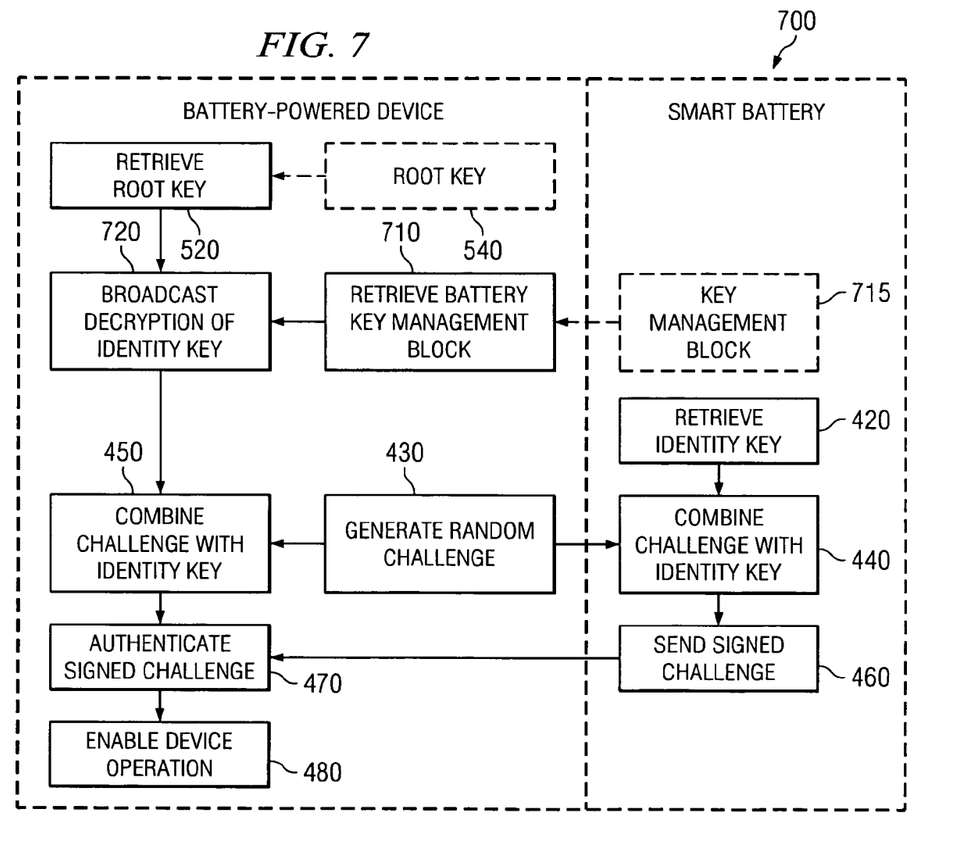
FIG. 7 illustrates a flow diagram of another alternate embodiment of a method of authentication of the identity of a battery by a host, employing broadcast encryption, carried out according to the principles of the present invention.

Additional flexibility in management of battery identities may be added by the use of a root key management block stored on smart battery 110. In a method known as broadcast encryption, multiple root keys are combined and encrypted using an identity key unique to the smart battery 110 to produce a root key management block, which is stored in the public non-volatile memory 220 during the manufacturing process. The unique key is also stored, in unencrypted form, in private non-volatile memory 240. The use of broadcast encryption provides for the use of multiple root keys and for the revocation of a root key that becomes compromised. If desired, each host could be programmed with its own root key as well, providing significantly increased security relative to the previous embodiments.

In FIG. 7, a flow diagram 700 illustrates the operation of this embodiment carried out according to the principles of the present invention. The authentication of the smart battery 110 begins with a step 710, in which root key management block 715 is communicated from smart battery 110 to the host 120. As in previous embodiments, the root key management block may be read by host 120 or transmitted by the smart battery 110. In step 520, the host retrieves locally stored root key 540. In a step 720, the host decrypts the root key management block 715 using the root key to extract the identity key of the smart battery 110. The method then continues with steps 420 and 450 as previously described.

Figure 8:
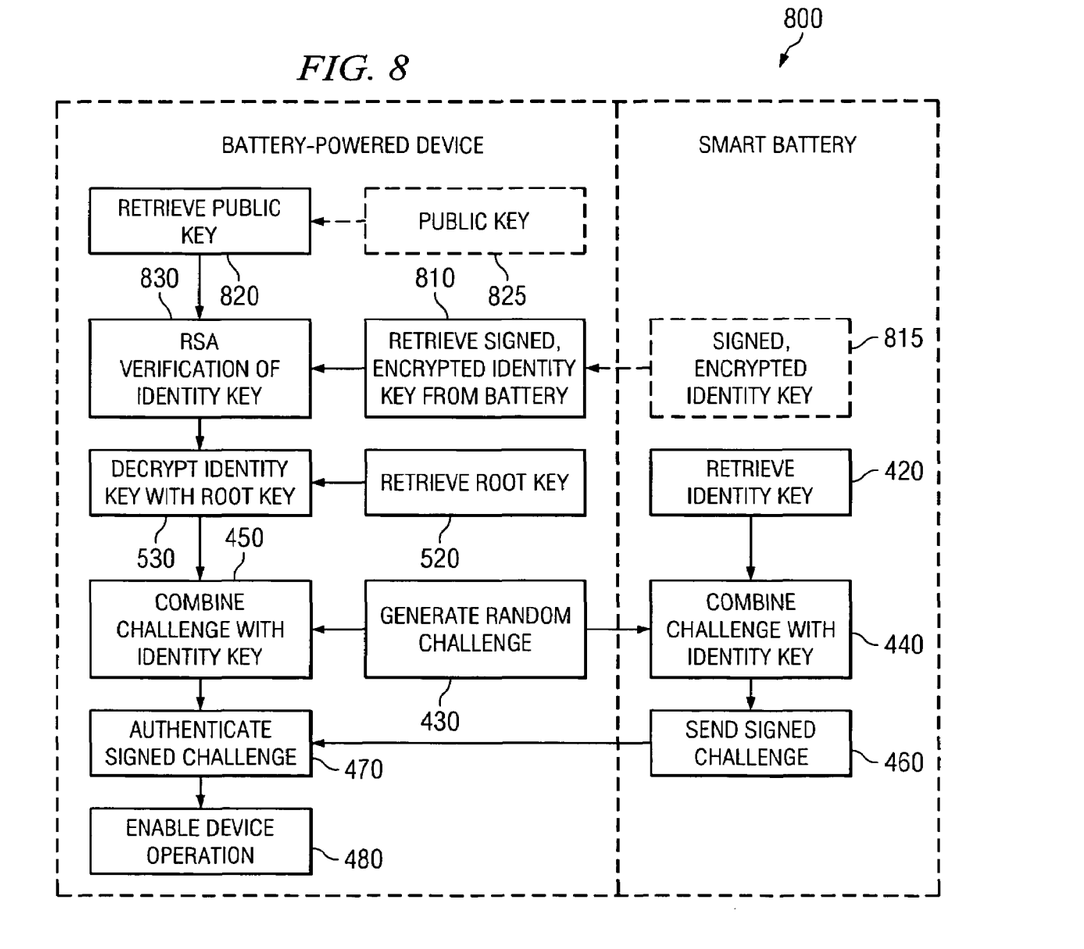
FIG. 8 illustrates a flow diagram of another alternate embodiment of a method of authentication of the identity of a battery by a host, employing public-private key verification of the identity information, carried out according to the principles of the present invention.

In a final embodiment shown in FIG. 8, additional security is provided by digitally signing the encrypted battery identity key with a private key and causing the signed identity key to be stored in the public non-volatile memory 220, while causing the unencrypted identity key to be stored in the private non-volatile memory 240. An algorithm such as the RSA algorithm may be used to sign the encrypted battery identity key. The RSA algorithm is one implementation of the general concept of public key cryptography, which allows a receiver of a communication signed with a private key to verify the validity of the communication using a public key. Use of such private-public key verification provides an additional layer of security to the authentication of the identity of the smart battery 110. For example, if public-private key verification were added to the embodiments described in the flow diagrams 500, 600, 700, even if an attacker were to discover the root key on the host, he could not reproduce valid batteries, since the attacker does not have the private key used to sign the encrypted identity at the factory.

The method of this embodiment is shown in a flow diagram 800 in FIG. 8, which begins with a step 810, in which the signed, encrypted identity of the smart battery 110 is communicated to host 120, either by transmission by smart battery 110 or by reading of the identity by host 120. In a step 820, the host retrieves a locally stored public key. In a step 830, the encrypted, signed identity key is verified using the RSA algorithm or other suitable method corresponding to the signing algorithm. The result of the verification is the encrypted identity of the smart battery 110, which can then be used as described previously in FIG. 5 or 6, step 530, or FIG. 7, step 720 as previously described.

Although the present invention has been described in detail, those skilled in the art should understand that they could make various changes, substitutions and alterations herein without departing from the spirit and scope of the invention in its broadest form.

What is claimed is:

1. A battery module, comprising:
  a public non-volatile memory containing an encrypted identity key to be decrypted by a root key in a host;
  a tamper resistant processing environment including private non-volatile memory containing another identity key;
  a challenge receiver operable within said battery module and configured to receive a challenge from said host; and
  a response generator operable within said battery module and configured to generate a response to the challenge based on the other identity key stored within the tamper resistant processing environment of said battery module.

2. The system as recited in claim 1 wherein said challenge is at least pseudorandom.

3. The system as recited in claim 1 wherein said response is formed by combining said challenge with said key using a message check algorithm.

4. The system as recited in claim 3 wherein said message integrity check algorithm employs a cyclic redundancy check.

5. The system as recited in claim 3 wherein said message integrity check algorithm employs a secure hash algorithm.

6. A method of operating a battery module, comprising:
  placing an encrypted identity key in a public non-volatile memory;
  transmitting the encrypted identity key from the battery module for decrypting the encrypted identity key by a root key contained in a host;
  placing another identity key in private non-volatile memory in a tamper resistant processing environment;
  receiving a challenge from said host; and
  generating a response based on the other identity key stored within the tamper resistant processing environment.

7. The method as recited in claim 6 wherein said challenge is at least pseudorandom.

8. The method as recited in claim 6 wherein said response is formed by combining said challenge with an identity of said battery module using a message check algorithm.

9. The system as recited in claim 8 wherein said message integrity check algorithm employs a cyclic redundancy check.

10. The system as recited in claim 8 wherein said message integrity check algorithm employs a secure hash algorithm.

11. The battery module of claim 1 in which the tamper resistant processing environment includes processor circuitry and private random access memory.

12. The battery module of claim 1 including a system on a chip that includes an interface to the host, the public non-volatile memory, and public random access memory coupled to the tamper resistant processing environment, and in which the tamper resistant processing environment includes processor circuitry, the private non-volatile memory, and private random access memory.

13. The battery module of claim 6 in which the tamper resistant processing environment includes processor circuitry and private random access memory.

14. The battery module of claim 6 including a system on a chip that includes an interface to the host, the public non-volatile memory, and public random access memory coupled to the tamper resistant processing environment, and in which the tamper resistant processing environment includes processor circuitry, the private non-volatile memory, and private random access memory.

* * * * *

UNITED STATES PATENT AND TRADEMARK OFFICE
CERTIFICATE OF CORRECTION

| | |
|---|---|
| PATENT NO. | : 7,613,924 B2 |
| APPLICATION NO. | : 11/074611 |
| DATED | : November 3, 2009 |
| INVENTOR(S) | : Shankar et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1255 days.

Signed and Sealed this

Nineteenth Day of October, 2010

David J. Kappos
*Director of the United States Patent and Trademark Office*